(12) United States Patent
Noishiki et al.

(10) Patent No.: US 12,304,182 B1
(45) Date of Patent: May 20, 2025

(54) BARRIER LAMINATE AND PACKAGING BAG

(71) Applicant: OJI Holdings Corporation, Tokyo (JP)

(72) Inventors: Yasutomo Noishiki, Tokyo (JP); Yuta Shamoto, Tokyo (JP); Moeka Namioka, Tokyo (JP); Misaki Wakabayashi, Tokyo (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 0 days.

(21) Appl. No.: 18/844,176

(22) PCT Filed: Mar. 13, 2023

(86) PCT No.: PCT/JP2023/009700
§ 371 (c)(1),
(2) Date: Sep. 5, 2024

(87) PCT Pub. No.: WO2023/176794
PCT Pub. Date: Sep. 21, 2023

(30) Foreign Application Priority Data

Mar. 16, 2022 (JP) ................................ 2022-041673

(51) Int. Cl.
| B32B 27/10 | (2006.01) |
| B32B 27/32 | (2006.01) |
| B32B 27/40 | (2006.01) |

(52) U.S. Cl.
CPC .............. *B32B 27/10* (2013.01); *B32B 27/32* (2013.01); *B32B 27/40* (2013.01); *B32B 2250/02* (2013.01); *B32B 2250/03* (2013.01); *B32B 2307/72* (2013.01); *B32B 2307/7246* (2013.01); *B32B 2553/00* (2013.01)

(58) Field of Classification Search
None
See application file for complete search history.

(56) References Cited

U.S. PATENT DOCUMENTS

2016/0040035 A1* 2/2016 Omura ............... C08G 18/7671
428/324

FOREIGN PATENT DOCUMENTS

| EP | 4 067 078 A1 | 10/2022 |
| EP | 4 269 689 A1 | 11/2023 |
| JP | 2021-138434 A | 9/2021 |
| JP | 6958756 B1 | 11/2021 |
| JP | 2022-158269 1 | 10/2022 |
| WO | WO 2021/106891 A1 | 6/2021 |
| WO | WO 2021/166910 A1 | 8/2021 |

OTHER PUBLICATIONS

International Search Report in PCT/JP2023/009700 dated May 30, 2023 in 2 pages.

* cited by examiner

*Primary Examiner* — Tae H Yoon
(74) *Attorney, Agent, or Firm* — KNOBBE, MARTENS, OLSON & BEAR LLP

(57) ABSTRACT

A barrier laminate which not only achieves both water vapor barrier performance and gas barrier performance at high levels even with a small number of layers (e.g., even with a single barrier layer), but also can reduce the amount of coating and thereby reduce the environmental load. The barrier laminate includes a barrier layer on at least one surface of a paper substrate, and the barrier layer contains a hydroxy polyurethane, a swellable layered silicate, and a cationic resin.

11 Claims, No Drawings

BARRIER LAMINATE AND PACKAGING BAG

CROSS-REFERENCE TO RELATED APPLICATIONS

This application is the U.S. National Phase under 35 U.S.C. § 371 of International Application PCT/JP2023/009700, filed Mar. 13, 2023, which claims priority to Japanese Patent Application No. 2022-041673, filed Mar. 16, 2022, the entire content of which is incorporated herein by reference.

TECHNICAL FIELD

The present disclosure relates to a barrier laminate, and a packaging bag using the same.

BACKGROUND ART

In packaging of food products, medical supplies, electronic components, and the like, packaging materials in which a paper substrate is provided with gas barrier performance (e.g., oxygen barrier performance) and water vapor barrier performance have been conventionally used for, for example, inhibiting the deterioration in quality of contents.

As a method of providing a paper substrate with water vapor barrier performance and gas barrier performance, a method of laminating a synthetic resin film or the like excellent in gas barrier performance on the paper substrate is generally employed. However, such a material in which a synthetic resin film or the like is laminated on a paper substrate has problems from an environmental point of view in that recycling of the paper, the synthetic resin, or the like is difficult after the use.

In view of this, gas barrier materials in which paper is used as a substrate without a synthetic resin film or the like have been developed. For example, Patent Document 1 discloses a technology relating to a paper barrier material in which a gas barrier layer and a heat-sealable layer are arranged in this order on a paper substrate, and hydroxy groups and acid groups of a resin used in the gas barrier layer are controlled.

RELATED ART DOCUMENT

Patent Document

[Patent Document 1] Japanese Unexamined Patent Application Publication No. 2021-138434

SUMMARY OF THE INVENTION

In the paper barrier material disclosed in Patent Document 1, the barrier layer is a single layer, allowing a reduction in the amount of plastic material. However, this paper barrier material is not considered sufficient from the standpoint of water vapor barrier performance.

The present disclosure provides a barrier laminate which not only achieves both water vapor barrier performance and gas barrier performance at high levels with a small number of layers (e.g., even with a single barrier layer), but also can reduce the coating amount of a barrier layer to be applied and thereby reduce the environmental load.

<1> A barrier laminate, including a barrier layer on at least one surface of a paper substrate, wherein
the barrier layer is a single layer,
the barrier layer has a water vapor permeability of less than 50 g/m$^2$·day at 40° C. and 90% RH,
the barrier layer has an oxygen permeability of 10.0 mL/m$^2$·day·atm or less at 23° C. and 50% RH,
the barrier laminate has a water vapor permeability of less than 50 g/m$^2$·day as measured in accordance with JIS Z 0208:1976 under the conditions of 40° C. and 90% RH,
an oxygen permeability at 23° C. and 50% RH is 10.0 mL/m$^2$·day·atm or less when a CPP film is laminated to the barrier laminate, and
a pulp recovery rate after re-disintegration of the barrier laminate is 85% by mass or more.
<2> The barrier laminate according to <1>, wherein the barrier layer contains a hydroxy polyurethane and a swellable layered silicate.
<3> The barrier laminate according to <2>, wherein the barrier layer further contains a cationic resin.
<4> A barrier laminate, including a barrier layer on at least one surface of a paper substrate,
wherein the barrier layer contains a hydroxy polyurethane, a swellable layered silicate, and a cationic resin.
<5> The barrier laminate according to <3> or <4>, wherein a content ratio of the cationic resin in the barrier layer is 1.0 to 20.0% by mass.
<6> The barrier laminate according to any one of <2> to <5>, wherein a content ratio of the hydroxy polyurethane in the barrier layer is 30.0 to 80.0% by mass.
<7> The barrier laminate according to any one of <2> to <6>, wherein a content ratio of the swellable layered silicate in the barrier layer is 5.0 to 30.0% by mass.
<8> The barrier laminate according to any one of <1> to <7>, wherein
the barrier layer further contains at least one selected from the group consisting of a water-suspendable polymer other than the hydroxy polyurethane and a water-soluble polymer other than the hydroxy polyurethane,
the water-suspendable polymer contains at least one selected from the group consisting of a styrene-butadiene copolymer, an acrylic resin, an olefin-unsaturated carboxylic acid copolymer, and a polyolefin resin, and
the water-soluble polymer contains at least one selected from the group consisting of a vinyl alcohol polymer, a (meth)acrylic acid polymer, a polyethylene glycol, a water-soluble polyamide, a polyacrylamide, a polyamine, a polycarboxylic acid, and a water-soluble cellulose derivative.
<9> The barrier laminate according to <8>, wherein a total content ratio of the water-suspendable polymer other than the hydroxy polyurethane and the water-soluble polymer other than the hydroxy polyurethane in the barrier layer is 2.0 to 50.0% by mass.
<10> The barrier laminate according to any one of <1> to <9>, wherein
the barrier laminate further includes a heat-sealable layer on the side in which the barrier layer is laminated, and
when a sample obtained by heat-sealing the heat-sealable layer of the barrier laminate with one another at 150° C. and 0.2 MPa for 1 second is peeled off using a tensile tester, a heat seal strength is 2.0 N/15 mm or more.
<11> The barrier laminate according to <10>, wherein a total coating amount of the barrier layer and the heat-sealable layer is 12 g/m$^2$ or less.
<12> The barrier laminate according to any one of <1> to <11>, wherein an oxygen permeability at 23° C. and 85% RH is 10.0 mL/m$^2$·day·atm or less when a CPP film is laminated to the barrier laminate.

<13> A packaging bag, including the barrier laminate according to any one of <1> to <12>.

MODE FOR CARRYING OUT THE INVENTION

In the present specification, "X to Y" representing a range means "X or more and Y or less". Where numerical ranges are described in a stepwise manner, an upper limit and a lower limit of the numerical ranges can be combined as desired. Further, in the present specification, unless otherwise specified, operations and measurement of physical properties and the like are performed under the conditions of room temperature (20 to 25° C.) and 40 to 50% RH.

As least one aspect of the present disclosure (hereinafter, also referred to as "first aspect") is a barrier laminate including a barrier layer on at least one surface of a paper substrate, wherein the barrier layer is a single layer,
the barrier layer has a water vapor permeability of less than 50 g/m$^2$·day at 40° C. and 90% RH,
the barrier layer has an oxygen permeability of 10.0 mL/m$^2$·day·atm or less at 23° C. and 50% RH,
the barrier laminate has a water vapor permeability of less than 50 g/m$^2$·day as measured in accordance with JIS Z 0208:1976 under the conditions of 40° C. and 90% RH,
an oxygen permeability at 23° C. and 50% RH is 10.0 mL/m$^2$·day·atm or less when a CPP film is laminated to the barrier laminate, and
a pulp recovery rate after re-disintegration of the barrier laminate is 85% by mass or more.

At least another aspect of the present disclosure (hereinafter, also referred to as "second aspect") relates to a barrier laminate including a barrier layer on at least one surface of a paper substrate, wherein the barrier layer contains (A) a hydroxy polyurethane, (B) a swellable layered silicate, and (C) a cationic resin. In the second aspect, the barrier laminate exhibits excellent water vapor barrier performance and gas barrier performance only with the barrier layer containing the components (A) to (C); however, the barrier laminate may further include a barrier layer other than this barrier layer.

The present inventors conducted intensive studies on a barrier laminate which not only achieves both water vapor barrier performance and gas barrier performance at high levels with a small number of layers (e.g., even with a single barrier layer), but also can reduce the coating amount of a barrier layer. As a result, the present inventors discovered that the above-described problems can be solved by the above-described barrier laminate.

In the first aspect, first, the barrier laminate has a water vapor permeability of less than 50 g/m$^2$·day as measured in accordance with JIS Z 0208:1976 under the conditions of 40° C. and 90% RH. The water vapor permeability is preferably 40 g/m$^2$·day or less, more preferably 30 g/m$^2$·day or less, still more preferably 20 g/m$^2$·day or less, yet still more preferably 15 g/m$^2$·day or less, especially preferably 10 g/m$^2$·day or less, and particularly preferably 8 g/m$^2$·day or less. A water vapor permeability in this range indicates an extremely high water vapor barrier performance.

A lower water vapor permeability is better and a lower limit thereof is thus not particularly limited; however, it is preferably 0 g/m$^2$·day or more, 1 g/m$^2$·day or more, 2 g/m$^2$·day or more, or 3 g/m$^2$·day or more. The water vapor permeability can be controlled by, for example, selecting the thickness and the constituents of the barrier layer.

The oxygen permeability at 23° C. and 50% RH is 10.0 mL/m$^2$·day·atm or less when a CPP film is laminated to the barrier laminate. The oxygen permeability is preferably 8.0 mL/m$^2$·day·atm or less, more preferably 5.0 mL/m$^2$·day·atm or less, still more preferably 3.0 mL/m$^2$·day·atm or less, yet still more preferably 2.0 mL/m$^2$·day·atm or less, further more preferably 1.5 mL/m$^2$·day·atm or less, especially preferably 1.0 mL/m$^2$·day·atm or less, and particularly preferably 0.5 L/m$^2$·day·atm or less. An oxygen permeability in this range indicates an extremely high oxygen barrier performance.

A lower oxygen permeability is better and a lower limit thereof is thus not particularly limited; however, it is preferably 0.0 mL/m$^2$·day·atm or more, or 0.1 mL/m$^2$·day·atm or more. The oxygen permeability can be controlled by, for example, selecting the thickness and the constituents of the barrier layer.

The barrier laminate includes a barrier layer on at least one surface of a paper substrate. In the first aspect, the barrier layer is a single layer. Further, the barrier layer has a water vapor permeability of less than 50 g/m$^2$·day at 40° C. and 90% RH.

The water vapor permeability of the barrier layer is preferably 40 g/m$^2$·day or less, more preferably 30 g/m$^2$·day or less, still more preferably 20 g/m$^2$·day or less, yet still more preferably 15 g/m$^2$·day or less, especially preferably 10 g/m$^2$·day or less, and particularly preferably 8 g/m$^2$·day or less.

A lower water vapor permeability is better and a lower limit thereof is thus not particularly limited; however, it is preferably 0 g/m$^2$·day or more, 1 g/m$^2$·day or more, 2 g/m$^2$·day or more, or 3 g/m$^2$·day or more.

The water vapor permeability of the barrier layer is measured by the measurement method described below in the section of Examples.

Further, the barrier layer has an oxygen permeability of 10.0 mL/m$^2$·day·atm or less at 23° C. and 50% RH.

The oxygen permeability of the barrier layer is preferably 8.0 mL/m$^2$·day·atm or less, more preferably 5.0 mL/m$^2$·day·atm or less, still more preferably 3.0 mL/m$^2$·day·atm or less, yet still more preferably 2.0 mL/m$^2$·day·atm or less, especially preferably 1.0 mL/m$^2$·day·atm or less, further more preferably 0.7 mL/m$^2$·day·atm or less, and particularly preferably 0.5 L/m$^2$·day·atm or less.

A lower oxygen permeability is better and a lower limit thereof is thus not particularly limited; however, it is preferably 0.0 mL/m$^2$·day·atm or more, or 0.1 mL/m$^2$·day·atm or more.

The oxygen permeability of the barrier layer is measured by the measurement method described below in the section of Examples.

Regarding the first aspect of the present disclosure, satisfying the above-described water vapor permeability and oxygen permeability by the barrier layer means that the barrier layer itself has extremely high water vapor barrier performance and gas barrier performance. Since the above-described high water vapor barrier performance and gas barrier performance can be achieved with a single layer, the coating amount of the barrier layer can be reduced, enabling reducing the weight of a product.

Meanwhile, regarding the second aspect of the present disclosure, by incorporating a hydroxy polyurethane, a swellable layered silicate, and a cationic resin into the barrier layer of the barrier laminate, a labyrinth effect attributed to the swellable layered silicate can be exerted efficiently. As a result, extremely high gas barrier performance and water vapor barrier performance can be exerted, which contributes to solving the above-described problems.

Further, the pulp recovery rate after re-disintegration of the barrier laminate can be increased and the biodegradability can thus be improved, so that a barrier laminate that can reduce the environmental load can be obtained. Moreover, since the number of layers of the barrier laminate can be reduced, not only the blister generation and the like can be inhibited, but also the barrier laminate can be produced in a smaller number of steps.

In the first aspect, whether or not the barrier layer is a single layer can be verified by preparing a cross-section along the direction perpendicular to the paper plane and observing the cross-section under an electron microscope. Alternatively, it can be verified by nondestructive observation using an X-ray CT device.

The water vapor permeability and the oxygen permeability can be controlled to be in the above-described respective ranges by, for example, selecting the materials used in the barrier layer.

The pulp recovery rate after re-disintegration of the barrier laminate is 85% by mass or more. A recovery rate in this range indicates that the barrier laminate has a high pulp content ratio and is highly recyclable. Further, a recovery rate in this range, together with satisfaction of the above-described water vapor permeability and oxygen permeability, indicate that a high water vapor barrier performance and a high gas barrier performance can both be achieved with a small coating amount.

The pulp recovery rate is preferably 88% by mass or more, more preferably 90% by mass or more, and still more preferably 92% by mass or more. An upper limit thereof is not particularly limited; however, it is preferably 99% by mass or less, 98% by mass or less, or 97% by mass or less.

The pulp recovery rate can be controlled by adjusting the coating amount of the barrier layer and the like, the content of a layered inorganic compound (swellable layered silicate) in the barrier layer, the basis weight of the paper substrate, and the like.

The oxygen permeability at 23° C. and 85% RH when a CPP film is laminated to the barrier laminate is preferably 10.0 mL/m$^2$·day·atm or less, more preferably 8.0 mL/m$^2$·day·atm or less, still more preferably 5.0 mL/m$^2$·day·atm or less, yet still more preferably 3.0 mL/m$^2$·day·atm or less, especially preferably 2.0 mL/m$^2$·day·atm or less, further more preferably 1.5 mL/m$^2$·day·atm or less, and particularly preferably 1.0 mL/m$^2$·day·atm or less.

A lower oxygen permeability is better and a lower limit thereof is thus not particularly limited; however, it is preferably 0.0 mL/m$^2$·day·atm or more, or 0.1 mL/m$^2$·day·atm or more.

Satisfying the above-described range of the oxygen permeability at 85% RH means that the barrier laminate exhibits sufficient gas barrier performance even in a high-humidity environment. The oxygen permeability at 85% RH can be controlled in the above-described range by selecting the materials used in the barrier layer.

The materials and the like of the barrier laminate will now be described.

<Paper Substrate>

The barrier laminate includes a paper substrate. The paper substrate is not particularly limited, and any known paper material can be used.

Pulp constituting the paper substrate preferably contains a plant-derived pulp as a main component, and contains a wood pulp as a main component. Examples of the wood pulp include hardwood pulp and softwood pulp. Examples of non-wood pulp include cotton pulp, hemp pulp, kenaf pulp, and bamboo pulp. A material other than pulp fiber, for example, a synthetic fiber such as rayon fiber or nylon fiber, may also be incorporated as an auxiliary paper material as long as it does not impair the effects of the present invention.

Specific examples of the paper substrate include bleached kraft paper, unbleached kraft paper, high-quality paper, paperboard, liner paper, coated paper, machine-glazed bleached kraft paper, glassine paper, and graphene paper. Thereamong, bleached kraft paper, unbleached kraft paper, high-quality paper, and machine-glazed bleached kraft paper are preferred. The paper substrate is more preferably bleached kraft paper or machine-glazed bleached paper, still more preferably machine glazed bleached kraft paper.

Additives may be added to the paper substrate. Examples of the additives include a pH modifier (e.g., sodium bicarbonate or sodium hydroxide), a dry strengthening agent (e.g., polyacrylamide or starch), a wet strengthening agent (e.g., any of a polyamide-polyamine-epichlorohydrin resin, a melamine-formaldehyde resin, and a urea-formaldehyde resin), an internal sizing agent (e.g., a rosin-based sizing agent or an alkyl ketene dimer), a drainage aid, an antifoaming agent, a filler (e.g., calcium carbonate or talc), and a dye. These additives may be used singly, or in combination of two or more kinds thereof. The content of the additives is not particularly limited, and may be in a range that is normally used.

(Basis Weight)

A basis weight of the paper substrate is not particularly limited; however, for example, in a packaging bag application, it is preferably 20 g/m$^2$ to 150 g/m$^2$, more preferably 30 g/m$^2$ to 100 g/m$^2$, still more preferably 40 g/m$^2$ to 70 g/m$^2$. The basis weight of the paper substrate is measured in accordance with JIS P 8124:2011.

(Paper Thickness)

A paper thickness of the paper substrate is not particularly limited; however, for example, in a packaging bag application, it is preferably 20 μm to 150 μm, more preferably 25 μm to 100 μm, still more preferably 30 μm to 50 μm. The paper thickness of the paper substrate is measured in accordance with JIS P 8118:2014.

(Oken Smoothness)

A smoothness of the paper substrate is not particularly limited. For example, the surface of the side in which the barrier layer is provided has an Oken smoothness of preferably 5 seconds or more, and more preferably 10 seconds or more. An upper limit thereof is not particularly limited; however, it is preferably 2,000 seconds or less, and more preferably 1,000 seconds or less. The Oken smoothness of the paper substrate is measured in accordance with JIS P 8155:2010.

(Method of Producing Paper Substrate)

As a method of producing the paper substrate, for example, a papermaking method using a pulp-containing paper stock. This paper stock may further contain additives. Examples of the additives include the above-exemplified additives.

The paper stock can be prepared by adding the additives to a pulp slurry. The pulp slurry can be obtained by beating a pulp in the presence of water. A pulp beating method and a beating apparatus are not particularly limited, and may be the same as any known beating method and beating apparatus. The content of the pulp in the paper stock is not particularly limited, and may be in a range that is usually used. For example, the content of the pulp is 60% by mass or more and less than 100% by mass with respect to a total mass of the paper stock.

The paper stock can be made into a paper by any conventional method. For example, a method in which the paper stock is flow-cast on a wire or the like and then dehydrated to obtain a wet paper sheet, after which a plurality of the wet paper sheet are layered as required, and a single layer of the wet paper sheet or plural layers of the wet paper sheets are subsequently pressed and dried, may be employed. In this process, a single-layer paper is obtained when a plurality of the wet paper sheet are not disposed, or a multi-layer paper is obtained when a plurality of the wet paper sheet are layered. When a plurality of wet paper sheets are layered, an adhesive may be applied to the surface of each wet paper sheet (the surface coming into contact with another wet paper sheet).

<Barrier Layer>

In the first aspect, the barrier laminate includes a single barrier layer on at least one surface of the paper substrate. As described above, the barrier layer exhibits high water vapor barrier performance and gas barrier performance. A material used in the barrier layer is not particularly limited as long as it is capable of exhibiting the above-described water vapor barrier performance and gas barrier performance. For example, any of the below-described known resins can be used.

Examples of a resin that can be used in the barrier layer include: polyolefin resins (e.g., polyethylene and polypropylene); vinyl chloride resins; styrene resins; styrene-butadiene copolymers; acrylonitrile-styrene copolymers; acrylonitrile-butadiene copolymers; ABS resins; AAS resins; AES resins; vinylidene chloride resins; polyurethane resins; poly-4-methylpentene-1 resins; polybutene-1 resins; vinylidene fluoride resins; vinyl fluoride resins; fluororesins; polycarbonate resins; polyamide resins; acetal resins; polyphenylene oxide resins; polyester resins (e.g., polyethylene terephthalate and polybutylene terephthalate); polyphenylene sulfide resins; polyimide resins; polysulfone resins; polyether sulfone resins; aromatic polyester resins; polyarylate resins; olefin-unsaturated carboxylic acid copolymers; styrene-unsaturated carboxylic acid copolymers; acrylic resins; polyvinyl alcohols and modified resins thereof; polyacrylic acids and salts thereof;

polysaccharide resins, such as cellulose derivatives, starch, and derivatives thereof; and naturally-occurring thermosetting resins such as natural rubber and shellac, and modified products thereof.

(Hydroxy Polyurethane)

In the first and the second aspects, the barrier layer preferably contains a hydroxy polyurethane so as to exhibit high water vapor barrier performance and gas barrier performance. The "hydroxy polyurethane" refers to a hydroxy group-containing polyurethane.

The hydroxy polyurethane has a hydroxyl value of preferably 100 to 500 mg KOH/g, more preferably 150 to 400 mg KOH/g, and still more preferably 200 to 350 mg KOH/g. When the hydroxyl value is in this range, the cohesive strength of the hydroxy polyurethane is improved, so that the barrier layer is likely to exhibit high barrier performance.

The hydroxy polyurethane may also contain an acid group. The hydroxy polyurethane has an acid value of preferably 50 to 100 mg KOH/g, more preferably 10 to 70 mg KOH/g, and still more preferably 15 to 60 mg KOH/g.

The acid value and the hydroxyl value of the hydroxy polyurethane can be measured by a titration method in accordance with JIS K 1557:2007.

As the hydroxy polyurethane, a commercially available product may be used. Examples thereof include HPU W-001, HPU W-003, and HPU W013A (all of which are manufactured by Dainichiseika Color & Chemicals Mfg. Co., Ltd.).

A content ratio of the hydroxy polyurethane in the barrier layer is preferably 30.0 to 80.0% by mass, more preferably 40.0 to 75.0% by mass, still more preferably 50.0 to 70.0% by mass, yet still more preferably 55.0 to 68.0% by mass, and further more preferably 60.0 to 66.0% by mass. When the content ratio of the hydroxy polyurethane is in this range, the water vapor barrier performance and the gas barrier performance are likely to be further improved. Further, when the content ratio of the hydroxy polyurethane is in this range, the barrier layer has good strength, so that good heat sealability is obtained when a heat-sealable layer is arranged on the barrier layer.

(Water-Suspendable Polymer and Water-Soluble Polymer)

In the first and the second aspects, the barrier layer preferably further contains at least one selected from the group consisting of a water-suspendable polymer other than the hydroxy polyurethane and a water-soluble polymer other than the hydroxy polyurethane. The water-suspendable polymer and the water-soluble polymer can be selected from the above-exemplified resins that can be used in the barrier layer.

The water-suspendable polymer other than the hydroxy polyurethane preferably contains at least one selected from the group consisting of a styrene-butadiene copolymer, an acrylic resin, an olefin-unsaturated carboxylic acid copolymer, and a polyolefin resin.

The water-soluble polymer other than the hydroxy polyurethane preferably contains at least one selected from the group consisting of a vinyl alcohol polymer, a (meth)acrylic acid polymer, a polyethylene glycol, a water-soluble polyamide, a polyacrylamide, a polyamine, a polycarboxylic acid, and a water-soluble cellulose derivative, more preferably contains at least one selected from the group consisting of a vinyl alcohol polymer and a (meth)acrylic acid polymer.

By using such a water-suspendable polymer or water-soluble polymer, the film-forming properties of the barrier layer are improved, so that the water vapor barrier performance and the gas barrier performance can be improved.

In the case of forming the barrier layer by aqueous coating, a water-soluble polymer has a superior effect of improving the film-forming properties as compared to a water-suspendable polymer. In addition, from the standpoint of improving the water resistance of the barrier layer to further improve the water vapor barrier performance, it is preferred to use a water-suspendable polymer in addition to a water-soluble polymer. In other words, the barrier layer preferably contains a water-suspendable polymer and a water-soluble polymer. In this case, the water-suspendable polymer is preferably an olefin-unsaturated carboxylic acid copolymer, more preferably an ethylene-(meth)acrylic acid copolymer, and the water-soluble polymer is preferably a vinyl alcohol polymer.

In the barrier layer, a mass-based content ratio of the water-suspendable polymer and the water-soluble polymer (water-suspendable polymer:water-soluble polymer) is preferably 20:1 to 1:2, more preferably 10:1 to 2:3, still more preferably 5:1 to 3:4, yet still more preferably 4:1 to 4:5.

(Water-Suspendable Polymer)

<<Styrene-Butadiene Copolymer>>

The styrene-butadiene copolymer is a copolymer obtained by emulsion polymerization of monomers consisting of: a styrene compound, such as styrene, α-methylstyrene, vinyltoluene, p-t-butylstyrene, or chlorostyrene; a butadiene compound, such as 1,3-butadiene, isoprene (2-methyl-1,3-butadiene), 2,3-dimethyl-1,3-butadiene, or 1,3-pentadiene; and other compound copolymerizable with these compounds.

The styrene compound is preferably styrene, and the butadiene compound is preferably 1,3-butadiene.

As the styrene-butadiene copolymer, a commercially available product may be used as well. Examples thereof include acid-modified styrene-butadiene copolymer binders, such as LX407S12 (manufactured by Zeon Corporation).

<<Styrene-Acrylic Copolymer>>

A styrene-acrylic copolymer is a copolymer obtained by emulsion polymerization of monomers consisting of: a styrene compound, such as styrene, α-methylstyrene, vinyltoluene, p-t-butylstyrene, or chlorostyrene; an acrylic compound, such as acrylic acid, methacrylic acid, (meth)acrylic acid ester, (meth)acrylamide propanesulfonic acid, or sodium sulfoalkyl (meth)acrylate (wherein, the alkyl group has 2 to 3 carbon atoms); and other compound copolymerizable with these compounds. The styrene compound is preferably styrene, and the acrylic compound is preferably acrylic acid, methacrylic acid, an acrylic acid ester, or a methacrylic acid ester, more preferably acrylic acid or an acrylic acid ester. The (meth)acrylic acid ester is preferably an alkyl acrylate, and its alkyl group preferably has 1 to 6 carbon atoms.

As a styrene-acrylic copolymer, a commercially available product may be used as well. Examples thereof include styrene-acrylic copolymer binders, such as JONCRYL HSL-9012 (manufactured by BASF Japan Ltd.).

<<Olefin-Unsaturated Carboxylic Acid Copolymer>>

The olefin-unsaturated carboxylic acid copolymer is a copolymer obtained by emulsion polymerization of monomers consisting of: an olefin, particularly an α-olefin such as propylene, or ethylene; an unsaturated carboxylic acid, such as acrylic acid, methacrylic acid, crotonic acid, cinnamic acid, itaconic acid, fumaric acid, maleic acid, or butenetricarboxylic acid; an unsaturated polycarboxylic acid alkyl ester having at least one carboxy group, such as itaconic acid monoethyl ester, fumaric acid monobutyl ester, or maleic acid monobutyl ester; and other compound copolymerizable with these compounds.

The olefin is preferably ethylene or an α-olefin, more preferably ethylene. Further, the unsaturated carboxylic acid monomer is preferably, for example, acrylic acid, methacrylic acid, itaconic acid, or fumaric acid.

Specific examples of the olefin-unsaturated carboxylic acid copolymer include commercially available aqueous dispersions of ethylene-acrylic acid copolymer ammonium salts, such as ZAIKTHENE (registered trademark) AC (acrylic acid copolymerization ratio: 20%, manufactured by Sumitomo Seika Chemicals, Co., Ltd.), which can be easily obtained and utilized.

<<Polyolefin Resin>>

The polyolefin resin is preferably a polymer of ethylene or α-olefin, more preferably a polyethylene. As the polyolefin resin, a commercially available product may be used as well. Examples thereof include polyolefin resin binders, such as HYDRECT HS (manufactured by DIC Corporation).

(Water-Soluble Polymer)

<<Vinyl Alcohol Polymer>>

Examples of the vinyl alcohol polymer include polyvinyl alcohols. The polyvinyl alcohols have a saponification degree of preferably 85.0 to 99.5% by mole, more preferably 90.0 to 99.0% by mole. As a polyvinyl alcohol, a commercially available product may be used as well. Examples thereof include EXCEVAL Series (manufactured by Kuraray Co., Ltd.).

<< (Meth)acrylic Acid Polymer>>

Examples of the (meth)acrylic acid polymer include polyacrylic acids, polymethacrylic acids, and salts thereof.

Examples of the salts include sodium poly(meth)acrylate and ammonium poly(meth)acrylate. As the (meth)acrylic acid polymer, a commercially available product may be used as well. Examples thereof include aqueous ammonium polyacrylate solutions, such as ARON A-30 (manufactured by Toagosei Co., Ltd.).

In addition, as the water-soluble polymer, any known polyethylene glycol, water-soluble polyamide, polyacrylamide, polyamine, polycarboxylic acid, a water-soluble cellulose derivative, or the like can be used. Examples of the polycarboxylic acid include polymaleic acids, acrylic acid-maleic acid copolymers, and polyglucuronic acids.

Examples of the water-soluble cellulose derivative include methylcellulose, hydroxymethylcellulose, hydroxyethylcellulose, carboxymethylcellulose, hydroxypropylcellulose, methylhydroxypropylcellulose, and methylhydroxyethylcellulose.

The water-suspendable polymer and the water-soluble polymer have a weight-average molecular weight of preferably 10,000 or more, more preferably 20,000 or more, but preferably 10,000,000 or less, more preferably 5,000,000 or less. The weight-average molecular weight of the water-suspendable polymer is measured by gel permeation chromatography (standard substance: polystyrene). The weight-average molecular weight of the water-soluble polymer is measured by gel permeation chromatography (standard substance: polyethylene glycol).

In the barrier layer, a total content ratio of the water-suspendable polymer other than the hydroxy polyurethane and the water-soluble polymer other than the hydroxy polyurethane is preferably 2.0 to 50.0% by mass, more preferably 5.0 to 45.0% by mass, still more preferably 10.0 to 35.0% by mass, yet still more preferably 15.0 to 25.0% by mass. When the total content ratio is in this range, the water vapor barrier performance and the gas barrier performance are likely to be further improved, and a superior heat sealability is obtained.

(Layered Inorganic Compound)

In the first aspect, in order to further improve the water vapor barrier performance and the gas barrier performance, the barrier layer may also contain a layered inorganic compound. The layered inorganic compound is in a plate-like form.

By using a layered inorganic compound in the barrier layer, the plate-like layered inorganic compound is likely to be laminated substantially parallel to the plane (surface) of the paper substrate. This leads to a reduction in the area where the layered inorganic compound is absent in the planar direction; therefore, permeation of water vapor therethrough is likely to be inhibited. Further, in the thickness direction, the plate-like layered inorganic compound exists in a state of being arranged parallel to the plane of the paper substrate; therefore, the water vapor in the layer permeates around the layered inorganic compound, and this labyrinth effect inhibits the permeation of water vapor. As a result, the barrier layer is likely to exhibit excellent water vapor barrier performance.

The layered inorganic compound has an average thickness of preferably 200 nm or less. The average thickness of the layered inorganic compound is more preferably 120 nm or less, still more preferably 50 nm or less, yet still more preferably 25 nm or less, and particularly preferably 10 nm or less. A smaller thickness of the layered inorganic compound leads to a greater number of layers of the layered inorganic compound in the barrier layer, so that high water vapor barrier performance can be exerted. A lower limit value of the thickness of the layered inorganic compound is not particularly limited; however, it is preferably 2 nm or more.

The average thickness of the layered inorganic compound in a state of being contained in the barrier layer is determined as follows. For a cross-section of the barrier layer, a magnified image is photographed under an electron microscope. In this process, the magnification is set such that about 20 to 30 pieces of the layered inorganic compound are included in the screen. The thickness is measured for individual pieces of the layered inorganic compound in the screen. An average of the thus measured thickness values is calculated and defined as the average thickness of the layered inorganic compound.

The layered inorganic compound has an average length of preferably 1 µm or more and 100 µm or less. When the average length is 1 µm or more, the layered inorganic compound is likely to be arranged parallel to the paper substrate. Meanwhile, when the average length is 100 µm or less, protrusion of a portion of the layered inorganic compound from the barrier layer is of little concern. The average length of the layered inorganic compound is more preferably 50 µm or less, still more preferably 30 µm or less, and particularly preferably 15 µm or less.

The average length of the layered inorganic compound in a state of being contained in the barrier layer is determined as follows. For a cross-section of the barrier layer, a magnified image is photographed under an electron microscope. In this process, the magnification is set such that about 20 to 30 pieces of the layered inorganic compound are included in the screen. The length is measured for individual pieces of the layered inorganic compound in the screen. An average of the thus measured length values is calculated and defined as the average length of the layered inorganic compound. It is noted here that the length of the layered inorganic compound may also be referred to as "particle size".

The layered inorganic compound has an aspect ratio of preferably 50 or higher. When the aspect ratio is 50 or higher, the water vapor barrier performance is likely to be further improved. The aspect ratio of the layered inorganic compound is preferably 80 or higher, more preferably 300 or higher, and particularly preferably 500 or higher. A higher aspect ratio leads to a further inhibition of the permeation of water vapor, so that the water vapor barrier performance is further improved. In addition, a higher aspect ratio can lead to a reduction in the amount of the layered inorganic compound to be added. An upper limit of the aspect ratio is not particularly limited and, from the standpoint of the viscosity of a coating liquid, it is preferably about 10,000 or lower, more preferably about 5,000 or lower, still more preferably about 2,000 or lower. The term "aspect ratio" used herein refers to a value obtained by dividing the average length of the layered inorganic compound by the average thickness of the layered inorganic compound, which average length and average thickness are determined by taking a magnified image of a cross-section of the barrier layer under an electron microscope in the above-described manner.

Specific examples of the layered inorganic compound include micas of the mica group and the brittle mica group, bentonites, kaolinites (kaolin minerals), pyrophyllite, talc, smectite, vermiculite, chlorite, septechlorite, serpentine, stilpnomelane, and montmorillonite.

Thereamong, particularly, from the standpoint of improving the barrier performance, one or more of a mica and a bentonite are preferably incorporated, and a mica or a bentonite is more preferably incorporated. Specific examples of the mica include synthetic micas (e.g., swellable micas and non-swellable micas), muscovite, sericite, phlogopite, biotite, fluorophlogopite (artificial mica), lepidolite, soda mica, roscoelite, illite, tin mica, palagonite, and brittle mica. Specific examples of the bentonite include montmorillonite.

In the first and the second aspects, the barrier layer preferably contains a swellable layered silicate, such as a swellable mica, as the layered inorganic compound. The barrier layer preferably contains a hydroxy polyurethane and a swellable layered silicate. The swellable layered silicate is a layered inorganic compound which is swellable with water, and whose layers are easily cleaved by shearing into a nanometer-order thickness. By using a combination of the hydroxy polyurethane and the swellable layer silicate, the swellable layered silicate that is thin and has a high aspect ratio is dispersed in a resin film of the hydroxy polyurethane that naturally has a high gas barrier performance, so that the barrier layer exhibits a further improved gas barrier performance due to a labyrinth effect.

Examples of the swellable layered silicate include sodium tetrasilisic mica, sodium hectorite, lithium taeniolite, fluorphlogopite, sodium smectite, and sodium montmorillonite.

The swellable layered silicate is preferably a swellable mica, such as sodium tetrasilisic mica. Among commercially available swellable layered silicates, examples of swellable micas include NTO-05 (manufactured by TOPY Industries, Ltd.) and SOMASIF ME300B-4T (manufactured by Katakura & Co-op Agri Corporation).

A content ratio of the swellable layered silicate in the barrier layer is preferably 5.0 to 30.0% by mass, more preferably 10.0 to 25.0% by mass, and still more preferably 13.0 to 24.0% by mass. When the content ratio of the swellable layered silicate is in this range, the water vapor barrier performance and the gas barrier performance are likely to be further improved.

(Cationic Resin)

In the first and the second aspects, the barrier layer preferably further contains a cationic resin in addition to the hydroxy polyurethane and the swellable layered silicate. By incorporating the cationic resin into the barrier layer, the gas barrier performance and the water vapor barrier performance, especially the water vapor barrier performance, are greatly improved, so that the oxygen permeability and the water vapor permeability in the above-described respective specific ranges are likely to be achieved.

Since the particle surface of the swellable layered silicate is easily anionically charged while the particle edge is easily cationically charged, the swellable layered silicate easily forms a card-house aggregation structure due to the interaction between the surface and the edge. By adding a cationic resin, the anionic groups on the particle surface can be blocked, so that the card-house aggregation structure can be destructed. Accordingly, steric aggregation of the swellable layered silicate can be inhibited to allow the swellable layered silicate to be aligned parallel to the plane of the paper substrate, and a labyrinth effect can be sufficiently exerted. As a result, extremely high gas barrier performance and water vapor barrier performance can be exerted.

Specific examples of the cationic resin include polyalkylene polyamines, polyamide compounds, modified polyamide compounds, polyamidoamine-epihalohydrin or formaldehyde condensation products, polyamine-epihalohydrin or formaldehyde condensation products, polyamide polyurea-epihalohydrin or formaldehyde condensation products, polyamine polyurea-epihalohydrin or formaldehyde condensation products, polyamidoamine polyurea-epihalohydrin or formaldehyde condensation products, polyamide polyurea compounds, polyamine polyurea compounds, polyamidoamine polyurea compounds, polyamidoamine compounds, polyethyleneimines, polyvinylpyridines, amino-modified acrylamide compounds, polyvinylamines, and polydiallyldimethylammonium chloride.

Thereamong, the cationic resin is preferably a modified polyamide compound, more preferably a modified polyamide resin. As the modified polyamide resin, a commercially available product may be used, and examples thereof include SPI203 (50) H manufactured by Taoka Chemical Co., Ltd.

The content of the cationic resin in the barrier layer may be selected as appropriate in accordance with the types of the materials used in the barrier layer, such as the hydroxy polyurethane and the swellable layered silicate. From the standpoint of further improving the barrier performance and/or the heat sealability, the content ratio of the cationic resin in the barrier layer is preferably 1.0 to 20.0% by mass, more preferably 1.0 to 10.0% by mass, still more preferably 1.5 to 8.0% by mass, yet still more preferably 1.8 to 5.0% by mass, and particularly preferably 2.0 to 3.0% by mass.

The cationic resin has a surface charge of preferably 0.1 to 10 meq/g, more preferably 0.1 to 5.0 meq/g, still more preferably 0.1 to 4.0 meq/g, yet still more preferably 0.1 to 2.0 meq/g, and particularly preferably 0.2 to 1.0 meq/g. When the surface charge of the cationic resin is equal to or more than the above-described lower limit, the effects of adding the cationic resin are sufficiently obtained. Meanwhile, when the surface charge is equal to or less than the above-described upper limit, the effects of the cationic resin can be more sufficiently exerted while inhibiting the aggregation of the swellable layered silicate.

The surface charge of the cationic resin is measured by the following method. First, a polymer used as a sample is dissolved in water to obtain a solution containing the polymer at a concentration of 1 ppm. To this solution, 0.001N sodium polyethylene sulfonate is added dropwise using a charge analyzer MUTEK PCD-04 (manufactured by BTG Instruments GmbH) to measure the charge amount.

If necessary, a dispersant, a surfactant, an antifoaming agent, a wetting agent, a dye, a color tone modifier, a thickening agent, and the like can be added to the barrier layer as appropriate within a range that does not impair the above-described specific barrier performance.

(Coating Amount of Barrier Layer)

The coating amount of the barrier layer is not particularly limited; however, from the standpoint of the barrier performance, the coating amount of the barrier layer in terms of the solid content after drying is preferably 1 $g/m^2$ or more, more preferably 2 $g/m^2$ or more and, from the standpoint of the re-disintegrability, it is preferably 15 $g/m^2$ or less, more preferably 10 $g/m^2$ or less, still more preferably 8 $g/m^2$ or less, yet still more preferably 6 $g/m^2$ or less. The barrier layer has a thickness of preferably 1 to 20 μm, more preferably 2 to 10 μm.

(Method of Forming Barrier Layer)

A method of forming the barrier layer is not particularly limited. For example, a barrier layer coating liquid, in which at least one resin selected from the group consisting of water-suspendable polymers and water-soluble polymers other than hydroxy polyurethanes, a hydroxy polyurethane, a swellable layered silicate, and a cationic resin are dispersed in a solvent, is prepared. It is preferred to form the barrier layer by applying the thus obtained barrier layer coating liquid to a paper substrate and subsequently drying the coating liquid.

The solvent of the barrier layer coating liquid is not particularly limited, and water or an organic solvent, such as ethanol, isopropyl alcohol, methyl ethyl ketone, or toluene, can be used. Thereamong, from the standpoint of avoiding the problems of a volatile organic solvent, a dispersion medium of the barrier layer coating liquid is preferably an aqueous medium, more preferably water. The term "aqueous medium" used herein refers to a medium that contains water in an amount of not less than 50% by mass.

A device used for applying the barrier layer coating liquid is not particularly limited, and may be selected as appropriate from those coating devices that are generally used. Examples thereof include various known coating devices, such as an air knife coater, a blade coater, a gravure coater, a rod blade coater, a roll coater, a reverse roll coater, a Meyer bar coater, a curtain coater, a die slot coater, a champrex coater, a metering blade-type size press coater, a short-dwell coater, a spray coater, a gate roll coater, and a lip coater.

<Heat-Sealable Layer>

In the first and the second aspect, the barrier laminate may further include a heat-sealable layer on the side in which the barrier layer is laminated. In the first aspect, even if the heat-sealable layer has barrier performance, it is classified as a heat-sealable layer when it is arranged for the purpose of providing a heat sealability. In the first aspect, the heat-sealable layer does not satisfy, for example, both of the above-described ranges of the water vapor permeability and the oxygen permeability of the barrier layer. Alternatively, in the first aspect, the heat-sealable layer may satisfy either one of the above-described ranges of the water vapor permeability and the oxygen permeability of the barrier layer.

On the other hand, in the second aspect, the heat-sealable layer may have barrier performance such as water vapor barrier performance and gas barrier performance. In the second aspect, the heat-sealable layer may satisfy at least one or both of the above-described ranges of the water vapor permeability and the oxygen permeability of the barrier layer.

The heat-sealable layer is a layer that is melted and adhered by heating, ultrasonic waves, or the like. The heat-sealable layer preferably contains a water-dispersible resin. Examples of the water-dispersible resin include those resins that are described above for the water-suspendable polymer other than the hydroxy polyurethane, and the water-dispersible resin is preferably, for example, a polyolefin resin, an acrylic resin such as a styrene-acrylic copolymer or an ethylene-(meth)acrylic acid copolymer, an ethylene-vinyl acetate copolymer, a polyester resin, a rubber-based resin, a urethane resin, or a polyamide resin. In addition to these resins, a lubricant such as paraffin wax, carnauba wax, or a polyolefin-based wax, as well as a pigment such as silica or kaolin may be added for inhibition of blocking and improvement of the oil resistance.

The heat-sealable layer is preferably a layer that contains at least one resin selected from the group consisting of styrene-acrylic copolymers and polyolefin resins. Examples of a commercially available material include a styrene-acrylic aqueous dispersion (product name: XP8829, manufactured by Seiko PMC Corporation) and a polyolefin aqueous dispersion (product name: RHOBARR 320, manufactured by The Dow Chemical Company).

When the heat-sealable layer has barrier performance, the water vapor permeability of the heat-sealable layer at 40° C. and 90% RH is, for example, about 1 to 100 g/m²·day in terms of a thickness of 20 μm. Further, the oxygen permeability of the heat-sealable layer at 23° C. and 50% RH is, for example, about 1 to 100 mL/m²·day·atm in terms of a thickness of 20 μm.

(Coating Amount of Heat-Sealable Layer)

The coating amount of the heat-sealable layer is not particularly limited; however, from the standpoint of the heat sealability, the coating amount of the heat-sealable layer in terms of the solid content after drying is preferably 1 g/m² or more, and more preferably 2 g/m² or more and, from the standpoint of the re-disintegrability, it is preferably 15 g/m² or less, more preferably 10 g/m² or less, still more preferably 8 g/m² or less, yet still more preferably 6 g/m² or less. The heat-sealable layer has a thickness of preferably 0.5 to 20 μm, and more preferably 1 to 10 μm.

(Method of Forming Heat-Sealable Layer)

A method of forming the heat-sealable layer is not particularly limited. For example, a heat-sealable layer coating liquid, in which a water-dispersible resin is dispersed in a solvent, is prepared. It is preferred to form the heat-sealable layer by applying the thus obtained heat-sealable layer coating liquid onto the barrier layer of the paper substrate and subsequently drying the coating liquid.

The solvent of the heat-sealable layer coating liquid is not particularly limited, and water or an organic solvent, such as ethanol, isopropyl alcohol, methyl ethyl ketone, or toluene, can be used. Thereamong, from the standpoint of avoiding the problems of a volatile organic solvent, a dispersion medium of the heat-sealable layer coating liquid is preferably an aqueous medium, and more preferably water.

A total coating amount of the barrier layer and the heat-sealable layer is preferably 12 g/m² or less, and more preferably 11 g/m² or less. A total coating amount in this range means that, even when the layers are thin, extremely high gas barrier performance and water vapor barrier performance can be exerted. Further, when the total coating amount is in this range, the pulp recovery rate is likely to be improved and a product can be further reduced in weight, so that the biodegradability is further improved.

A lower limit of the total coating amount is not particularly limited; however, it is preferably 2 g/m² or more, more preferably 5 g/m² or more, and still more preferably 8 g/m² or more.

When a sample obtained by heat-sealing the heat-sealable layer of the barrier laminate with one another at 150° C. and 0.2 MPa for 1 second is peeled off using a tensile tester, the heat seal strength is preferably 2.0 N/15 mm or more, more preferably 2.5 N/15 mm or more, still more preferably 2.8 N/15 mm or more, yet still more preferably 3.0 N/15 mm or more. When the heat seal strength is in this range, breakage of a bag during transport of its contents can be inhibited.

An upper limit of the heat seal strength is not particularly limited; however, it is preferably 10.0 N/15 mm or less, 7.0 N/15 mm or less, 5.0 N/15 mm or less, or 4.0 N/15 mm or less.

In the first and the second aspects, the barrier laminate may include other layer in addition to the above-described barrier layer and heat-sealable layer. In the second aspect, the other layer may have a barrier performance of a water vapor barrier layer, a gas barrier layer, or the like.

<Production of Barrier Laminate>

A method of producing the barrier laminate is not particularly limited, and any known method may be employed. The method of producing the barrier laminate includes the step of first applying a barrier layer coating liquid onto a paper substrate to form a barrier layer. If necessary, the method may also include the step of forming a heat-sealable layer by applying a heat-sealable layer coating liquid to the surface of the paper substrate on which the barrier layer has been applied. The formation of each layer is as described above.

It is noted here that the layers may be formed by sequential application of the respective coating liquids and subsequent drying, or may be formed by simultaneous multilayer application of the coating liquids and subsequent drying.

A drying equipment for drying each coating layer is not particularly limited, and any known equipment can be used. Examples of the drying equipment include a hot air dryer, an infrared dryer, a gas burner, and a hot plate.

In the first aspect of the present disclosure, the barrier laminate includes a barrier layer on at least one surface of a paper substrate. The barrier laminate preferably includes the paper substrate, the barrier layer, and a heat-sealable layer in the order mentioned. The barrier laminate may be a laminate consisting of only the paper substrate and a single layer of the barrier layer, or may be a laminate consisting of only the paper substrate, a single layer of the barrier layer, and the heat-sealable layer.

The second aspect of the present disclosure provides a barrier laminate including a barrier layer on at least one surface of a paper substrate, in which the barrier layer contains (A) a hydroxy polyurethane, (B) a swellable layered silicate, and (C) a cationic resin.

According to this aspect, extremely high water vapor barrier performance and gas barrier performance which are attributed to the hydroxy polyurethane, the swellable layered silicate, and the cationic resin can be exerted, and the coating amount of the barrier laminate can be reduced.

In the second aspect, the barrier layer containing the components (A) to (C) exhibits excellent water vapor barrier performance and gas barrier performance even in a single layer; however, the barrier laminate may include two or more thereof. Further, in the second aspect, when the barrier laminate further includes other layer (e.g., a heat-sealable layer), the other layer may have a barrier performance of a water vapor barrier layer, a gas barrier layer, or the like. In other words, in the second aspect, the water vapor permeability and the oxygen permeability may include a contribution from the other layer in addition to the contributions from the barrier layer containing the components (A) to (C).

The barrier laminate can be preferably used as a material for packaging a food product, a cosmetic product, a miscellaneous daily goods, a medical supply, an electronic component, or the like. The barrier laminate has extremely high water vapor barrier performance and gas barrier performance; therefore, it can also be preferably used as a material for packaging contents having a fragrance or odor. Further, the barrier laminate can be preferably used as a material for packaging a product that is exposed to high-humidity conditions, such as a food product, a cosmetic product, a miscellaneous daily goods, a medical supply, or an electronic component. The barrier laminate can be preferably used as, for example: a soft packaging material, such as a wrapping paper, a packaging bag, a lid, or a label; a liquid container, such as a milk carton; and a packaging container, such as a cup, a tray, a dish, a cover, or a laminated tube. The content to be packaged may be a liquid, a solid (e.g., a granular material or a powder material), or a gel.

[Packaging Bag]

The packaging bag according to another embodiment of the present disclosure is a packaging bag including the above-described barrier laminate. The packaging bag may be in the form of, for example, a standing pouch, or a side seal-type, two-sided seal-type, three-sided seal-type, four-sided seal-type, envelope seal-type, butt seal-type (pillow seal-type), ribbed seal-type, flat bottom seal-type, square bottom seal-type, or gusset-type bag.

The packaging bag of the present embodiment may be one in which the barrier laminate having a heat-sealable layer is folded or stacked in two layers such that the heat-sealable layer faces one another, and the peripheral edges are sealed in such a manner to obtain the above-described form. Alternatively, the packaging bag may be one in which the barrier laminate is folded or stacked in two layers, and the peripheral edges are bonded using an adhesive in such a manner to obtain the above-described form.

[Oxygen Permeability at 23° C. and 50% RH]

The oxygen permeability of the barrier laminate was measured using an oxygen permeability measuring device (OX-TRAN 2/22, manufactured by MOCON, Inc.) under the conditions of a temperature of 23° C. and a relative humidity of 50%. Specifically, a laminated sheet was formed by applying an isocyanate-based adhesive (manufactured by DIC Corporation; 1 part of DICDRY KW-75 mixed with 10 parts of DICDRY LX-500) to the barrier layer surface of the barrier laminate in an amount of 5 g/m², and subsequently laminating thereto a 20 μm-thick CPP film (unstretched polypropylene film: GP-32 manufactured by Hokuetsu Kasei Co., Ltd.).

For the thus obtained laminated sheet, the oxygen permeability at a temperature of 23° C. and a relative humidity of 50% was measured in accordance with JIS K 7126-2: 2006. The smaller the value of the oxygen permeability, the superior is the oxygen barrier performance. It is noted here that the reason for laminating the CPP film is to make it easier to perform the measurement without being affected by the irregularities of the laminate, and the CPP film has no effect on the oxygen permeability.

[Oxygen Permeability at 23° C. and 85% RH]

The oxygen permeability at 23° C. and 85% RH was measured in the same manner as the above-described measurement of the oxygen permeability at 23° C. and 50% RH, except that the conditions were changed to a temperature of 23° C. and a relative humidity of 85%.

[Water Vapor Permeability]

The water vapor permeability of each barrier laminate obtained in Examples and Comparative Examples was measured in accordance with JIS Z 0208:1976 (Dish Method) Method B (40° C.±0.5° C., relative humidity 90%±2%), with the surface on which the barrier layer was formed being arranged on the inner side.

[Oxygen Permeability of Barrier Layer at 23° C. and 50% RH]

The oxygen permeability of the barrier layer at 23° C. and 50% RH in the barrier laminate can be determined by the following procedure.

(Cases where Materials of Layer Other than Barrier Layer, e.g., Heat-Sealable Layer, are Available)

For example, when the barrier laminate has a layer configuration of paper substrate/barrier layer/heat-sealable layer, the oxygen permeability is determined as follows. It is noted here that the layer configuration of the barrier laminate can be analyzed by cross-sectional observation under an electron microscope, X-ray CT measurement, or the like.

Procedure 1: The oxygen permeability of the barrier laminate is measured. The oxygen permeability of the barrier laminate can be measured by the above-described method.

Procedure 2: The thickness of the heat-sealable layer is analyzed. The thickness of the heat-sealable layer can be measured by cross-sectional observation under an electron microscope, X-ray CT measurement, or the like. The heat-sealable layer is applied to an unstretched polypropylene film or a PET film such that the thus measured thickness of the heat-sealable layer is obtained, and the oxygen permeability can be inferred in terms of the heat-sealable layer itself.

Procedure 3: From the oxygen permeability of the barrier laminate determined in Procedure 1 and the oxygen permeability of the heat-sealable layer itself determined in Procedure 2, the oxygen permeability of the barrier layer itself is calculated based on the following equation. In this process, the oxygen permeability of the paper substrate does not have to be taken into account when a glassine paper is not used as the paper substrate (for reference, when the barrier laminate has a total light transmittance of less than 60%).

$1/P = 1/P_1 + 1/P_2 + \ldots + 1/P_n$

P: oxygen permeability of barrier laminate $P_1, P_2, \ldots P_n$: oxygen permeability of each layer (Cases where Materials of Layer Other than Barrier Layer, e.g., Heat-Sealable Layer, are not Available)

For example, when the barrier laminate has a layer configuration of paper substrate/barrier layer/heat-sealable layer, the oxygen permeability is determined as follows. It is noted here that the layer configuration of the barrier laminate can be analyzed by cross-sectional observation under an electron microscope, X-ray CT measurement, or the like.

Procedure 1: The oxygen permeability of the barrier laminate is measured. The oxygen permeability of the barrier laminate can be measured by the above-described method.

Procedure 2: The materials and the thickness of the heat-sealable layer are analyzed. The materials of the heat-sealable layer can be analyzed by pyrolysis GC/MS, FT-IR analysis, Raman spectrum analysis, or the like. The thickness of the heat-sealable layer can be measured by cross-sectional observation under an electron microscope, X-ray CT measurement, or the like. From the materials and the thickness of the heat-sealable layer, the oxygen permeability can be inferred in terms of the heat-sealable layer.

Procedure 3: From the oxygen permeability of the barrier laminate determined in Procedure 1 and the oxygen permeability of the heat-sealable layer itself determined in Procedure 2, the oxygen permeability of the barrier layer itself is calculated based on the following equation. In this process, the oxygen permeability of the paper substrate does not have to be taken into account when a glassine paper is not used as the paper substrate (for reference, when the barrier laminate has a total light transmittance of less than 60%).

$1/P = 1/P_1 + 1/P_2 + \ldots + 1/P_n$

P: oxygen permeability of barrier laminate $P_1, P_2, \ldots P_n$: oxygen permeability of each layer

[Water Vapor Permeability of Barrier Layer]

The water vapor permeability of the barrier layer at 40° C. and 90% RH in the barrier laminate can be determined by the following procedure.

(Cases Where Materials of Layer Other Than Barrier Layer, e.g., Heat-Sealable Layer, Are Available)

For example, when the barrier laminate has a layer configuration of paper substrate/barrier layer/heat-sealable layer, the water vapor permeability is determined as follows. It is noted here that the layer configuration of the barrier laminate can be analyzed by cross-sectional observation under an electron microscope, X-ray CT measurement, or the like (analysis method).

Procedure 1: The water vapor permeability of the barrier laminate is measured. The water vapor permeability of the barrier laminate can be measured by the above-described method.

Procedure 2: The thickness of the heat-sealable layer is analyzed. The thickness of the heat-sealable layer can be measured by cross-sectional observation under an electron microscope, X-ray CT measurement, or the like. The heat-sealable layer is applied to an unstretched polypropylene film or a PET film such that the thus measured thickness of the heat-sealable layer is obtained, and the water vapor permeability can be inferred in terms of the heat-sealable layer itself.

Procedure 3: From the water vapor permeability of the barrier laminate determined in Procedure 1 and the water vapor permeability of the heat-sealable layer itself determined in Procedure 2, the water vapor permeability of the barrier layer itself is calculated based on the following equation. In this process, the water vapor permeability of the paper substrate does not have to be taken into account when a glassine paper is not used as the paper substrate (for reference, when the barrier laminate has a total light transmittance of less than 60%).

$1/P = 1/P_1 + 1/P_2 + \ldots + 1/P_n$

P: water vapor permeability of barrier laminate $P_1, P_2, \ldots P_n$: water vapor permeability of each layer (Cases where Materials of Layer Other than Barrier Layer, e.g., Heat-Sealable Layer, are not Available)

For example, when the barrier laminate has a layer configuration of paper substrate/barrier layer/heat-sealable layer, the water vapor permeability is determined as follows. It is noted here that the layer configuration of the barrier laminate can be analyzed by cross-sectional observation under an electron microscope, X-ray CT measurement, or the like (analysis method).

Procedure 1: The water vapor permeability of the barrier laminate is measured. The water vapor permeability of the barrier laminate can be measured by the above-described method.

Procedure 2: The materials and the thickness of the heat-sealable layer are analyzed. The materials of the heat-sealable layer can be analyzed by pyrolysis GC/MS, FT-IR analysis, Raman spectrum analysis, or the like. The thickness of the heat-sealable layer can be measured by cross-sectional observation under an electron microscope, X-ray CT measurement, or the like. From the materials and the thickness of the heat-sealable layer, the water vapor permeability can be inferred in terms of the heat-sealable layer itself.

Procedure 3: From the water vapor permeability of the barrier laminate determined in Procedure 1 and the water vapor permeability of the heat-sealable layer itself determined in Procedure 2, the water vapor permeability of the barrier layer itself is calculated based on the following equation. In this process, the water vapor permeability of the paper substrate does not have to be taken into account when a glassine paper is not used as the paper substrate (for reference, when the barrier laminate has a total light transmittance of less than 60%).

$1/P = 1/P_1 + 1/P_2 + \ldots + 1/P_n$

P: water vapor permeability of barrier laminate $P_1, P_2, \ldots P_n$: water vapor permeability of each layer

[Evaluation of Re-Disintegrability (Pulp Recovery Rate after Re-Disintegration)]

The barrier laminate in an absolute dry mass of 30 g was torn by hand into 3 to 4-cm squares and immersed in 20° C. tap water overnight. After dilution with tap water to a barrier laminate concentration of 2.5% by mass, a 20-minute disintegration treatment was performed using a TAPPI standard disintegrator (manufactured by Kumagai Riki Kogyo Co., Ltd.) at a rotation speed of 3,000 rpm. The thus obtained pulp slurry was applied to a flat screen (manufactured by Kumagai Riki Kogyo Co., Ltd.) in which a 6-cut (slit width: 0.15 mm) screen plate was set, and screened in a water stream of 8.3 L/min.

The undisintegrated material remaining on the screen plate was recovered and dried in a 105° C. oven, and the absolute dry mass thereof was measured to calculate the pulp recovery rate using the following equation:

Pulp recovery rate (%)={Absolute dry mass (g) of tested barrier laminate−Absolute dry mass (g) of undisintegrated material}/Absolute dry mass of tested barrier laminate×100

[Measurement of Heat-Seal Peel Strength]

A pair of barrier laminates was stacked such that the coating layers faced each other, and then heat-sealed using a heat seal tester (TP-701-B, manufactured by Tester Sangyo Co., Ltd.) at 150° C. and 0.2 MPa for 1 second. The resulting heat-sealed test piece was left to stand for at least 4 hours in a room having a temperature of 23° C.±1° C. and a humidity of 50%±2%. Subsequently, this heat-sealed test piece was cut at a width of 15 mm and peeled off in a T-shape using a tensile tester (TENSILON universal material tester RTC-1250A, manufactured by A&D Co., Ltd.) at a tensile speed of 300 mm/min, and the recorded maximum load was defined as the heat-seal peel strength (N/15 mm).

EXAMPLES

The present invention will now be described concretely by way of Examples thereof; however, the present invention is not limited to the below-described Examples. It is noted here that, unless otherwise specified, the below-described operations were performed under the conditions of 25° C. and 50% RH. Further, unless otherwise specified, "part(s)" and "(%)" in Examples and Comparative Examples denote "part(s) by mass" and "% by mass", respectively.

Example 1

To 33.3 parts by mass of an aqueous dispersion of a layered inorganic compound (swellable mica (sodium tetrasilisic mica), average length: 6.3 μm, aspect ratio: about 1,000, thickness: about 5 nm, solid concentration: 6% by mass, product name: NTO-05, manufactured by TOPY Industries, Ltd.), 6.8 parts by mass of a self-emulsifying emulsion of an ethylene-acrylic acid copolymer (solid concentration: 29.2% by mass, product name: ZAIKTHENE AC, manufactured by Sumitomo Seika Chemicals Co., Ltd.) was added with stirring, and 26.7 parts by mass of a self-emulsifying aqueous emulsion of a hydroxy polyurethane (hydroxyl value: 235 mg KOH/g, solid concentration: 30% by mass, product name: HPU-W013A, manufactured by Dainichiseika Color & Chemicals Mfg. Co., Ltd.) was further added, followed by stirring.

To the resultant, 0.57 parts by mass of a modified polyamide resin (surface charge: 0.4 meq/g, solid concentration: 53% by mass, product name: SPI203 (50) H, manufactured by Taoka Chemical Co., Ltd.) was added as a cationic resin, followed by stirring. Further, 0.30 parts by mass of a 25%-by-mass aqueous ammonia solution was added, followed by stirring. Thereafter, the solid concentration was adjusted to be 19% by mass by adding dilution water, whereby a barrier layer coating liquid was prepared.

This barrier layer coating liquid was applied to one surface of a 50-g/$m^2$ paper substrate (machine glazed bleached kraft paper, manufactured by Oji F-Tex Co., Ltd.) in an amount of 5 g/$m^2$ in terms of solid content, and subsequently dried at 120° C. for 1 minute to form a barrier layer. Further, as a heat-sealable layer coating liquid, a styrene-acrylic aqueous dispersion (solid concentration: 48% by mass, product name: XP8829, manufactured by Seiko PMC Corporation) was diluted with water to a solid concentration of 22% by mass, applied in an amount of 5 g/$m^2$ in terms of solid content, and then dried at 120° C. for 1 minute to form a heat-sealable layer, whereby a heat-sealable barrier laminate was obtained. It is noted here that a blow dryer was used for drying the respective layers.

The heat-sealable layer had an oxygen permeability of more than 10.0 mL/$m^2$·day·atm at 23° C. and 50% RH, and thus does not correspond to the barrier layer of the first aspect.

Example 2

A heat-sealable barrier laminate was obtained by forming a barrier layer and a heat-sealable layer on a paper substrate in the same manner as in Example 1, except that the amount of the self-emulsifying emulsion of the ethylene-acrylic acid copolymer and that of the self-emulsifying aqueous emulsion of the hydroxy polyurethane in the barrier layer coating liquid were changed to 13.7 parts by mass and 20.0 parts by mass, respectively.

Example 3

A heat-sealable barrier laminate was obtained by forming a barrier layer and a heat-sealable layer on a paper substrate in the same manner as in Example 1, except that the amount of the swellable mica in the barrier layer coating liquid was changed to 50 parts by mass.

Example 4

A heat-sealable barrier laminate was obtained by forming a barrier layer and a heat-sealable layer on a paper substrate in the same manner as in Example 1, except that the paper substrate was changed to a 70-g/$m^2$ bleached kraft paper (OK Bleached Kraft, manufactured by Ojimateria Co., Ltd.).

Example 5

A heat-sealable barrier laminate was obtained by forming a barrier layer and a heat-sealable layer on a paper substrate in the same manner as in Example 1, except that the self-emulsifying emulsion of the ethylene-acrylic acid copolymer was changed to 5.1 parts by mass of a styrene-acrylic copolymer binder (solid concentration: 39% by mass, product name: JONCRYL HSL-9012, manufactured by BASF Japan Ltd.).

Example 6

A heat-sealable barrier laminate was obtained by forming a barrier layer and a heat-sealable layer on a paper substrate in the same manner as in Example 1, except that the self-emulsifying emulsion of the ethylene-acrylic acid copolymer was changed to 4.3 parts by mass of an acid-modified styrene-butadiene copolymer binder (solid concentration: 46% by mass, product name: LX407S12, manufactured by Zeon Corporation).

Example 7

A heat-sealable barrier laminate was obtained by forming a barrier layer and a heat-sealable layer on a paper substrate in the same manner as in Example 1, except that the self-emulsifying emulsion of the ethylene-acrylic acid copolymer was changed to 8.7 parts by mass of a polyolefin resin binder (solid concentration: 23% by mass, product name: HYDRECT HS, manufactured by DIC Corporation).

Example 8

A heat-sealable barrier laminate was obtained by forming a barrier layer and a heat-sealable layer on a paper substrate in the same manner as in Example 1, except that the amount of the cationic resin in the barrier layer coating liquid was changed to 1.90 parts by mass.

Example 9

A heat-sealable barrier laminate was obtained by forming a barrier layer and a heat-sealable layer on a paper substrate in the same manner as in Example 1, except that the self-emulsifying emulsion of the ethylene-acrylic acid copolymer was changed to 20.0 parts by mass of an aqueous solution obtained by dissolving a polyvinyl alcohol (product name: EXCEVAL HR-3010, manufactured by Kuraray Co., Ltd.) in water to a solid concentration of 10% by mass.

Example 10

A heat-sealable barrier laminate was obtained by forming a barrier layer and a heat-sealable layer on a paper substrate in the same manner as in Example 1, except that the heat-sealable layer coating liquid was changed to a polyolefin aqueous dispersion (solid concentration: 43% by mass, product name: RHOBARR 320, manufactured by The Dow Chemical Company). It is noted here that the heat-sealable layer had a water vapor permeability of 50 g/$m^2$·day or more at 40° C. and 90% RH and an oxygen permeability of more than 10.0 mL/$m^2$·day·atm at 23° C. and 50% RH, and thus does not correspond to the barrier layer of the first aspect.

Example 11

A heat-sealable barrier laminate was obtained by forming a barrier layer and a heat-sealable layer on a paper substrate in the same manner as in Example 1, except that the self-emulsifying emulsion of the ethylene-acrylic acid copolymer was changed to 40.0 parts by mass of an aqueous ammonium polyacrylate solution (solid concentration: 30% by mass, product name: ARON A-30, manufactured by Toagosei Co., Ltd.) that was adjusted to have a solid concentration of 5% by mass.

Example 12

A heat-sealable barrier laminate was obtained by forming a barrier layer and a heat-sealable layer on a paper substrate in the same manner as in Example 10, except that the added amount of the self-emulsifying emulsion of the ethylene-acrylic acid copolymer was changed to 3.4 parts by mass, and that 10.0 parts by mass of an aqueous polyvinyl alcohol solution, which was obtained by dissolving a polyvinyl alcohol (product name: EXCEVAL HR-3010, manufactured by Kuraray Co., Ltd.) in water to a solid concentration of 10% by mass, was further added to the barrier layer coating liquid.

Example 13

A heat-sealable barrier laminate was obtained by forming a barrier layer and a heat-sealable layer on a paper substrate in the same manner as in Example 10, except that the amount of the self-emulsifying emulsion of the hydroxy polyurethane, the amount of the self-emulsifying aqueous emulsion of the ethylene-acrylic acid copolymer, and the amount of the cationic resin in the barrier layer coating liquid were changed to 31.7 parts by mass, 1.7 parts by mass, and 1.90 parts by mass, respectively, and that the coating amount of the heat-sealable layer was changed to 3 g/m² (in terms of solid content).

Example 14

A barrier laminate was obtained by forming a barrier layer on a paper substrate in the same manner as in Example 1, except that the heat-sealable layer coating liquid was not applied.

Example 15

A heat-sealable barrier laminate was obtained by forming a barrier layer and a heat-sealable layer on a paper substrate in the same manner as in Example 10, except that the amount of the swellable mica and that of the cationic resin in the barrier layer coating liquid were changed to 83.3 parts by mass and 5.7 parts by mass, respectively, and that the coating amount of the heat-sealable layer was changed to 3 g/m² (in terms of solid content).

Example 16

A heat-sealable barrier laminate was obtained by forming a barrier layer and a heat-sealable layer on a paper substrate in the same manner as in Example 10, except that: the added amount of the self-emulsifying emulsion of the ethylene-acrylic acid copolymer was changed to 5.1 parts by mass; 5.0 parts by mass of an aqueous polyvinyl alcohol solution, which was obtained by dissolving a polyvinyl alcohol (product name: EXCEVAL RS-1717, manufactured by Kuraray Co., Ltd.) in water to a solid concentration of 10% by mass, was further added to the barrier layer coating liquid; and the coating amount of the heat-sealable layer was changed to 3 g/m² (in terms of solid content).

Comparative Example 1

A heat-sealable barrier laminate was obtained by forming a barrier layer and a heat-sealable layer on a paper substrate in the same manner as in Example 1, except that the amount of the self-emulsifying emulsion of the ethylene-acrylic acid copolymer and that of the self-emulsifying aqueous emulsion of the hydroxy polyurethane in the barrier layer coating liquid were changed to 34.2 parts by mass and 0 part by mass, respectively.

Comparative Example 2

A heat-sealable barrier laminate was obtained by forming a barrier layer and a heat-sealable layer on a paper substrate in the same manner as in Example 1, except that the amount of the swellable mica and that of the cationic resin in the barrier layer coating liquid were both changed to 0 part by mass.

Comparative Example 3

A heat-sealable barrier laminate was obtained by forming a barrier layer and a heat-sealable layer on a paper substrate in the same manner as in Example 1, except that the amount of the cationic resin in the barrier layer coating liquid was changed to 0 part by mass.

Comparative Example 4

A heat-sealable barrier laminate was obtained by forming a barrier layer and a heat-sealable layer on a paper substrate in the same manner as in Example 1, except that the amount of the cationic resin in the barrier layer coating liquid was changed to 18.9 parts by mass.

Comparative Example 5

A heat-sealable barrier laminate was obtained by forming a barrier layer and a heat-sealable layer on a paper substrate in the same manner as in Example 1, except that the swellable mica in the barrier layer coating liquid was changed to 2 parts by mass of kaolin (engineered kaolin, average length: 0.89 μm, aspect ratio: about 33, thickness: about 27 nm, solid concentration: 100% by mass, product name: CONTOUR XTREME, manufactured by IMERYS S.A.).

Comparative Example 6

A heat-sealable barrier laminate was obtained by forming a barrier layer and a heat-sealable layer on a paper substrate in the same manner as in Example 1, except that the self-emulsifying aqueous emulsion of the hydroxy polyurethane in the barrier layer coating liquid was changed to 80.0 parts by mass of an aqueous polyvinyl alcohol solution obtained by dissolving a polyvinyl alcohol (product name: EXCEVAL AQ-4104, manufactured by Kuraray Co., Ltd.) in water to a solid concentration of 10% by mass.

[Sealability]

The paper laminates of Examples and Comparative Examples were each molded into a pillow-type packaging bag and heat-sealed to produce packaging bags. One side of each of the thus obtained packaging bags was cut, and a heat seal checker (product name: AGELESS SEAL CHECK, manufactured by Mitsubishi Gas Chemical Co., Inc., components: a high-boiling-point ester, a high-boiling-point hydrocarbon, a vegetable oil, and an azo-based oil-soluble dye) was added dropwise to each packaging bag to evaluate the presence or absence of leakage from a sealed portion.

A: The packaging bag was sealed without the leakage of the heat seal checker solution.

B: The heat seal checker solution leaked, a pin-hole was generated, and/or the packaging bag was not adhered.

For each of the thus obtained barrier laminates, Tables 1 to 3 show the formulations (solid content ratio in parts by mass), the physical properties, the evaluation results, the oxygen permeability and the water vapor permeability of the barrier layer itself, and the content ratio (% by mass) of each material in the barrier layer.

In Tables, the unit of "Coating amount" is $g/m^2$; the unit of "Oxygen permeability" is $mL/m^2 \cdot day \cdot atm$; the unit of "Water vapor permeability" (measured at 40° C. and 90% RH) is $g/m^2 \cdot day$; and the unit of "Heat seal strength" is N/15 mm. Further, "Re-disintegrability" represents the pulp recovery rate (% by mass) after re-disintegration of each barrier laminate.

In Tables, "Oxygen permeability" of the barrier layer represents the oxygen permeability of the barrier layer at 23° C. and 50% RH, and "Water vapor permeability" of the barrier layer represents the water vapor permeability of the barrier layer at 40° C. and 90% RH.

In Tables, regarding "Content in barrier layer", "water-suspendable polymer, etc." represents a total content ratio of a water-suspendable polymer other than hydroxy polyurethane and a water-soluble polymer other than hydroxy polyurethane.

[Oxygen Permeability of Barrier Layer at 23° C. and 50% RH]

The oxygen permeability of the barrier layer itself was measured using an oxygen permeability measuring device (OX-TRAN 2/22, manufactured by MOCON, Inc.) under the conditions of a temperature of 23° C. and a relative humidity of 50%. Specifically, a barrier layer was formed by applying a barrier layer coating liquid in accordance with the formulation and the coating amount of each of Examples and Comparative Examples to a paper substrate (machine glazed bleached kraft paper, basis weight: 50 $g/m^2$, manufactured by Oji F-Tex Co., Ltd.) and subsequently drying the coating liquid at 120° C. for 1 minute. Further, an isocyanate-based adhesive (manufactured by DIC Corporation; 1 part of DICDRY KW-75 mixed with 10 parts of DICDRY LX-500) was applied to the surface of the paper substrate on the barrier layer side in an amount of 5 $g/m^2$, and a 20 μm-thick CPP film (unstretched polypropylene film: GP-32 manufactured by Hokuetsu Kasei Co., Ltd.) was subsequently laminated thereto, whereby a laminated sheet was formed.

For the thus obtained laminated sheet, the oxygen permeability at a temperature of 23° C. and a relative humidity of 50% was measured in accordance with JIS K 7126-2: 2006. The smaller the value of the oxygen permeability, the superior is the oxygen barrier performance. It is noted here that the reason for laminating the CPP film is to make it easier to perform the measurement without being affected by the irregularities of the laminate, and the CPP film has no effect on the oxygen permeability.

[Water Vapor Permeability of Barrier Layer]

A barrier layer was formed by applying a barrier layer coating liquid in accordance with the formulation and the coating amount of each of Examples and Comparative Examples to a paper substrate (machine glazed bleached kraft paper, basis weight: 50 $g/m^2$, manufactured by Oji F-Tex Co., Ltd.) and subsequently drying the coating liquid at 120° C. for 1 minute, and the water vapor permeability was subsequently measured in accordance with JIS Z 0208: 1976 (Dish Method) Method B (40° C.±0.5° C., relative humidity 90%±2%), with the surface on which the barrier layer was formed being arranged on the inner side.

TABLE 1

| | Example No. Paper substrate | 1 Machine-glazed bleached paper | 2 Machine-glazed bleached paper | 3 Machine-glazed bleached paper | 4 Bleached kraft paper | 5 Machine-glazed beached paper | 6 Machine-glazed bleached paper | 7 Machine-glazed bleached paper | 8 Machine-glazed bleached paper |
|---|---|---|---|---|---|---|---|---|---|
| Barrier layer solid content ratio (parts) | Hydroxy polyurethane | 80 | 60 | 80 | 80 | 80 | 80 | 80 | 80 |
| | Ethylene-acrylic acid copolymer | 20 | 40 | 20 | 20 | | | | 20 |
| | Styrene-acrylic acid copolymer | | | | | 20 | | | |
| | Styrene-butadiene copolymer | | | | | | 20 | | |
| | Polyolefin resin | | | | | | | 20 | |
| | Polyvinyl alcohol | | | | | | | | |
| | Polyacrylic acid | | | | | | | | |
| | Swellable mica | 20 | 20 | 30 | 20 | 20 | 20 | 20 | 20 |
| | Cationic resin | 3 | 3 | 3 | 3 | 3 | 3 | 3 | 10 |
| | Coating amount | 5 | 5 | 5 | 5 | 5 | 5 | 5 | 5 |
| Heat-sealable layer solid content ratio (parts) | Styrene-acryl | 100 | 100 | 100 | 100 | 100 | 100 | 100 | 100 |
| | Polyolefin dispersion | — | — | — | — | — | — | — | — |
| | Coating amount | 5 | 5 | 5 | 5 | 5 | 5 | 5 | 5 |
| Evaluation | Oxygen permeability (23° C. 50% RH) | 0.5 | 1.0 | 0.3 | 1.0 | 0.8 | 1.0 | 0.9 | 0.5 |
| | Oxygen permeability (23° C. 85% RH) | 0.7 | 1.2 | 0.5 | 1.3 | 1.1 | 1.5 | 1.3 | 0.9 |
| | Water vapor permeability | 6 | 5 | 4 | 7 | 7 | 6 | 7 | 9 |
| | Sealability | A | A | A | A | A | A | A | A |
| | Heat seal strength | 3.1 | 2.9 | 3.0 | 3.1 | 3.3 | 3.1 | 3.2 | 3.1 |
| | Re-disintegrability | 92 | 94 | 95 | 95 | 92 | 92 | 92 | 95 |

TABLE 1-continued

| | Example No.<br>Paper substrate | 1<br>Machine-glazed bleached paper | 2<br>Machine-glazed bleached paper | 3<br>Machine-glazed bleached paper | 4<br>Bleached kraft paper | 5<br>Machine-glazed beached paper | 6<br>Machine-glazed bleached paper | 7<br>Machine-glazed bleached paper | 8<br>Machine-glazed bleached paper |
|---|---|---|---|---|---|---|---|---|---|
| Barrier layer | Oxygen permeability | 0.6 | 1.2 | 0.5 | 0.6 | 1.0 | 1.3 | 1.2 | 0.8 |
| | Water vapor permeability | 8 | 7 | 6 | 8 | 9 | 9 | 10 | 14 |
| Content in barrier layer (% by mass) | Hydroxy polyurethane | 65.0 | 48.8 | 60.2 | 65.0 | 65.0 | 65.0 | 65.0 | 61.5 |
| | Water-suspendable polymer, etc. | 16.3 | 32.5 | 15.0 | 16.3 | 16.3 | 16.3 | 16.3 | 15.4 |
| | Swellable mica | 16.3 | 16.3 | 22.6 | 16.3 | 16.3 | 16.3 | 16.3 | 15.4 |
| | Cationic resin | 2.4 | 2.4 | 2.3 | 2.4 | 2.4 | 2.4 | 2.4 | 7.7 |

TABLE 2

| | Example No.<br>Paper substrate | 9<br>Machine-glazed bleached paper | 10<br>Machine-glazed bleached paper | 11<br>Machine-glazed bleached paper | 12<br>Machine-glazed bleached paper | 13<br>Machine-glazed bleached paper | 14<br>Machine-glazed bleached paper | 15<br>Machine-glazed bleached paper | 16<br>Machine-glazed bleached paper |
|---|---|---|---|---|---|---|---|---|---|
| Barrier layer solid content ratio (parts) | Hydroxy polyurethane | 80 | 80 | 80 | 80 | 95 | 80 | 80 | 80 |
| | Ethylene-acrylic acid copolymer | | 20 | | 10 | 5 | 20 | 20 | 15 |
| | Styrene-acrylic acid copolymer | | | | | | | | |
| | Styrene-butadiene copolymer | | | | | | | | |
| | Polyolefin resin | | | | | | | | |
| | Polyvinyl alcohol | 20 | | | 10 | | | | 5 |
| | Polyacrylic acid | | | 20 | | | | | |
| | Swellable mica | 20 | 20 | 20 | 20 | 20 | 20 | 50 | 20 |
| | Cationic resin | 3 | 3 | 3 | 3 | 10 | 3 | 30 | 3 |
| | Coating amount | 5 | 5 | 5 | 5 | 5 | 5 | 5 | 5 |
| Heat-sealable layer solid content ratio (parts) | Styrene-acryl | 100 | — | 100 | — | — | — | — | — |
| | Polyolefin dispersion | — | 100 | — | 100 | 100 | — | 100 | 100 |
| | Coating amount | 5 | 5 | 5 | 5 | 3 | 0 | 3 | 3 |
| Evaluation | Oxygen permeability (23° C. 50% RH) | 0.2 | 0.4 | 0.4 | 0.3 | 0.7 | 0.5 | 0.5 | 0.5 |
| | Oxygen permeability (23° C. 85% RH) | 0.8 | 0.7 | 0.8 | 0.7 | 1.2 | 1.0 | 1.0 | 1.0 |
| | Water vapor permeability | 6 | 8 | 7 | 8 | 6 | 10 | 3 | 3 |
| | Sealability | A | A | A | A | B | B | B | A |
| | Heat seal strength | 3.3 | 3.5 | 2.8 | 3.2 | 1.2 | — | 1.4 | 3.5 |
| | Re-disintegrability | 95 | 92 | 95 | 93 | 92 | 96 | 94 | 92 |
| Barrier layer | Oxygen permeability | 0.5 | 0.6 | 0.8 | 0.4 | 1.1 | 0.6 | 0.8 | 1.0 |
| | Water vapor permeability | 8 | 8 | 10 | 12 | 9 | 8 | 7 | 6 |
| Content in barrier layer (% by mass) | Hydroxy polyurethane | 65.0 | 65.0 | 65.0 | 65.0 | 73.1 | 65.0 | 44.4 | 65.0 |
| | Water-suspendable polymer, etc. | 16.3 | 16.3 | 16.3 | 16.3 | 3.8 | 16.3 | 11.1 | 16.3 |
| | Swellable mica | 16.3 | 16.3 | 16.3 | 16.3 | 15.4 | 16.3 | 27.8 | 16.3 |
| | Cationic resin | 2.4 | 2.4 | 2.4 | 2.4 | 7.7 | 2.4 | 16.7 | 2.4 |

In Example 14, the packaging bag was not adhered in the measurement of the heat seal strength.

TABLE 3

| | Paper substrate | Comparative Example 1 Machine-glazed bleached paper | Comparative Example 2 Machine-glazed bleached paper | Comparative Example 3 Machine-glazed bleached paper | Comparative Example 4 Machine-glazed bleached paper | Comparative Example 5 Machine-glazed bleached paper | Comparative Example 6 Machine-glazed bleached paper |
|---|---|---|---|---|---|---|---|
| Gas barrier layer solid content ratio (parts) | Hydroxy polyurethane | 0 | 80 | 80 | 80 | 80 | |
| | Ethylene-acrylic acid copolymer | 100 | 20 | 20 | 20 | 20 | 20 |
| | Styrene-acrylic acid copolymer | | | | | | |
| | Styrene-butadiene copolymer | | | | | | |
| | Polyolefin resin | | | | | | |
| | Polyvinyl alcohol | | | | | | 80 |
| | Polyacrylic acid | | | | | | |
| | Swellable mica | 20 | 0 | 20 | 20 | | 20 |
| | Kaolin | | | | | 20 | |
| | Cationic resin | 3 | 0 | 0 | 100 | 3 | 3 |
| | Coating amount | 5 | 5 | 5 | 5 | 5 | 5 |
| Heat-sealable layer solid content ratio (parts) | Polyolefin dispersion | 100 | 100 | 100 | 100 | 100 | 100 |
| | Coating amount | 5 | 5 | 5 | 5 | 5 | 5 |
| Evaluation | Oxygen permeability (23° C., 50% RH) | 60 | 250 | 0.5 | 1 | 100 | 0.3 |
| | Oxygen permeability (23° C., 85% RH) | 85 | 300 | 0.9 | 13 | 145 | 7.8 |
| | Water vapor permeability | 5 | 20 | 50 | 50 | 200 | 300 |
| | Sealability | A | A | A | B | A | A |
| | Heat seal strength | 2.9 | 3.4 | 2.9 | 1.9 | 3.3 | 3.4 |
| | Re-disintegrability | 90 | 86 | 90 | 95 | 92 | 96 |
| Barrier layer | Oxygen permeability | 95 | 300 | 2 | 2 | 120 | 0.9 |
| | Water vapor permeability | 7 | 23 | 68 | 70 | 320 | 580 |
| Content in barrier layer (% by mass) | Hydroxy polyurethane | 0.0 | 80.0 | 66.7 | 36.4 | 65.0 | 0.0 |
| | Water-suspendable polymer, etc. | 81.3 | 20.0 | 16.7 | 9.1 | 16.3 | 81.3 |
| | Swellable mica | 16.3 | 0.0 | 16.7 | 9.1 | 0.0 | 16.3 |
| | Cationic resin | 2.4 | 0.0 | 0.0 | 45.5 | 2.4 | 2.4 |

The invention claimed is:

1. A barrier laminate, comprising a barrier layer on at least one surface of a paper substrate,
wherein the barrier layer contains a hydroxy polyurethane, a swellable layered silicate, and a cationic resin, wherein
a content ratio of the cationic resin in the barrier layer is 1.0 to 10.0% by mass,
the barrier layer further contains at least one selected from the group consisting of a water-suspendable polymer other than the hydroxy polyurethane and a water-soluble polymer other than the hydroxy polyurethane,
the water-suspendable polymer contains at least one selected from the group consisting of a styrene-butadiene copolymer, an acrylic resin, an olefin-unsaturated carboxylic acid copolymer, and a polyolefin resin, and
the water-soluble polymer contains at least one selected from the group consisting of a vinyl alcohol polymer, a (meth)acrylic acid polymer, a polyethylene glycol, a water-soluble polyamide, a polyacrylamide, a polyamine, a polycarboxylic acid, and a water-soluble cellulose derivative.

2. The barrier laminate according to claim 1, wherein a mass-based content ratio of the water-suspendable polymer and the water-soluble polymer (water-suspendable polymer: water-soluble polymer) in the barrier layer is 20:1 to 1:2.

3. The barrier laminate according to claim 1, wherein a content ratio of the hydroxy polyurethane in the barrier layer is 30.0 to 80.0% by mass.

4. The barrier laminate according to claim 1, wherein a content ratio of the swellable layered silicate in the barrier layer is 5.0 to 30.0% by mass.

5. The barrier laminate according to claim 1, wherein a total content ratio of the water-suspendable polymer and the water-soluble polymer in the barrier layer is 2.0 to 50.0% by mass.

6. The barrier laminate according to claim 1, wherein
the barrier laminate further comprises a heat-sealable layer on the side in which the barrier layer is laminated, and
when a sample obtained by heat-sealing the heat-sealable layer of the barrier laminate with one another at 150° C. and 0.2 MPa for 1 second is peeled off using a tensile tester, a heat seal strength is 2.0 N/15 mm or more.

7. The barrier laminate according to claim 6, wherein a total coating amount of the barrier layer and the heat-sealable layer is 12 g/m² or less.

8. The barrier laminate according to claim 1, wherein an oxygen permeability at 23° C. and 85% RH is 10.0 mL/m²·day·atm or less when a unstretched polypropylene (CPP) film is laminated to the barrier laminate.

9. A packaging bag, comprising the barrier laminate according to claim 1.

10. The barrier laminate according to claim 1, wherein the water-suspendable polymer includes an ethylene-(meth) acrylic acid copolymer, and the water-soluble polymer includes a vinyl alcohol polymer.

11. The barrier laminate according to claim 1, wherein a pulp recovery rate after re-disintegration of the barrier laminate is 85% by mass or more.

\* \* \* \* \*